United States Patent
Alabbas et al.

(10) Patent No.: US 11,089,123 B2
(45) Date of Patent: Aug. 10, 2021

(54) SERVICE WORKER PUSH VIOLATION ENFORCEMENT

(71) Applicant: Microsoft Technology Licensing, LLC, Redmond, WA (US)

(72) Inventors: Ali Alabbas, Sammamish, WA (US); Steven J. Becker, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 15/980,359

(22) Filed: May 15, 2018

(65) Prior Publication Data
US 2019/0356748 A1 Nov. 21, 2019

(51) Int. Cl.
*H04L 29/08* (2006.01)
*G06Q 10/06* (2012.01)

(52) U.S. Cl.
CPC ...... *H04L 67/26* (2013.01); *G06Q 10/063114* (2013.01); *H04L 67/02* (2013.01); *H04L 67/22* (2013.01); *H04L 67/36* (2013.01)

(58) Field of Classification Search
None
See application file for complete search history.

(56) References Cited

U.S. PATENT DOCUMENTS

| | | | | |
|---|---|---|---|---|
| 8,311,041 | B1* | 11/2012 | Nerieri | H04L 51/12 370/390 |
| 9,317,344 | B2* | 4/2016 | Woley | G06F 9/542 |
| 9,419,968 | B1* | 8/2016 | Pei | G06F 21/31 |
| 2010/0138501 | A1* | 6/2010 | Clinton | G06F 11/3006 709/206 |
| 2010/0154027 | A1* | 6/2010 | Sobel | G06F 21/552 726/1 |
| 2016/0014057 | A1* | 1/2016 | Gudla | H04L 63/08 709/206 |
| 2016/0196006 | A1* | 7/2016 | Doan | G06F 3/0481 715/779 |
| 2016/0197865 | A1* | 7/2016 | Kim | H04L 51/06 709/206 |
| 2018/0365255 | A1* | 12/2018 | Kim | G06F 16/9038 |
| 2019/0007373 | A1* | 1/2019 | Slobodskyy | H04L 67/02 |

* cited by examiner

*Primary Examiner* — James A Edwards

(57) ABSTRACT

In one embodiment, a computer system detects a notification for a service worker. The service worker being configured to process the notification for a website. The computer system monitors a behavior of the service worker in response to receiving the notification and compares the behavior to one or more policies for the notification to determine that the behavior violated at least one of the one or more policies. The one or more policies describe restrictions on behavior for producing a visible result for the notification or responding to the notification within a time period. The computer system then performs a mitigation action based on the service worker violating the at least one of the one or more policies, the mitigation action restricting an aspect of use of the notification for the website.

20 Claims, 7 Drawing Sheets

SERVICE WORKER PUSH VIOLATION ENFORCEMENT

BACKGROUND

Push notifications are messages that come from an application or website where the request for a given message is initiated by the application or website. The messages can be made to appear on the user's desktop or device, even when users are not using the application or visiting the website. One form of push technology is referred to as "web" push, in which push notifications can originate from a website or other web application. Web push allows a user visiting a website to opt-in and receive notifications from that website, without requiring any applications to be downloaded or otherwise installed on the user's device.

To enable the web push, a service worker can be configured to run in the background to process a push notification. For example, the operating system may receive a push message and then notify the service worker of the push message. The service worker can then execute software code, such as JavaScript™, and generate a push notification with details from the push message. The website then runs software code to perform some action, such as display the push notification. In some examples, the push notification may require a response from the user. For example, a push notification may notify the user that the user has unread email messages and provide an option for the user to display a webpage with the unread email messages. Upon receiving a selection from the user, the website may again run software code to process the selection. For example, the service worker may cause the webpage to be displayed on the user interface by placing the focus on an already opened window (or tab in a window) or alternatively navigating to the webpage in a window.

In some examples, the website may perform some unwanted actions while processing the push notification, which may result in an unsatisfactory user interface experience. For example, when a service worker receives the push notification, the service worker may choose to not show a notification. However, by virtue of receiving the push notification, the service worker may be authorized to run in the background. Instead of displaying the push notification, the website may cause the service worker to perform some undesirable action, such as using the computing resources for some unrelated task. Because the service worker is running in the background and the user does not receive a push notification, the user may not know the service worker is using the computing resources without authorization in the background. Also, even if a push notification is output, when the user selects the push notification, the service worker may choose to delay processing the response while using the computing resources for some other task. The delay in processing the response may also cause an unsatisfactory user interface experience while using computing resources without authorization in the background. Accordingly, the above behavior of the service worker may degrade the performance of the computing device in addition to providing a user experience that may be unsatisfactory.

DETAILED DESCRIPTION

Figure 1:
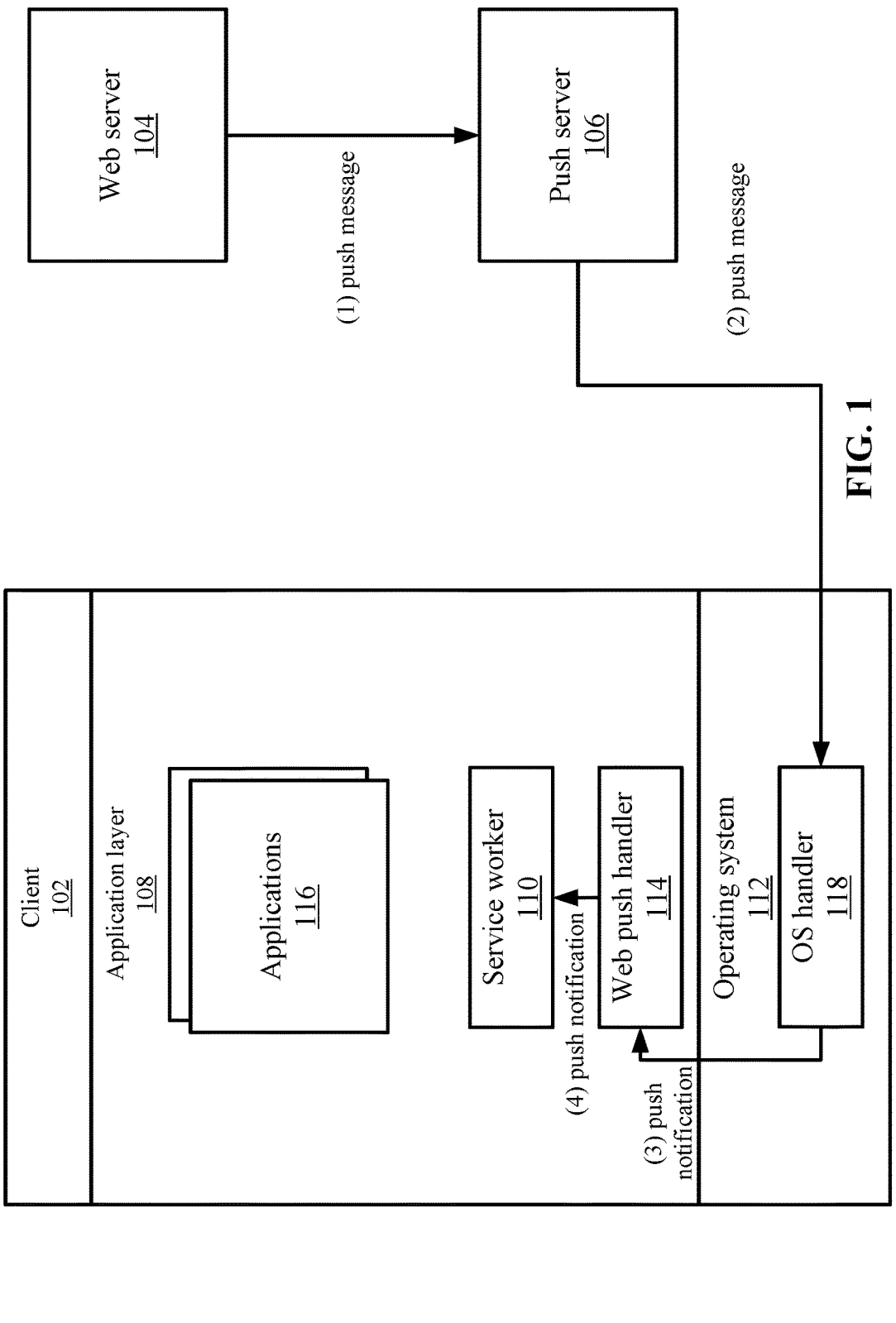
FIG. 1 depicts a simplified system for analyzing behavior of service workers according to some embodiments.

An operating system of a computing device may receive a push message from a push server. For example, a website may have sent an update to the push server regarding some event, such as a newly-received e-mail message. The push server then sends a push message to the client. In some embodiments, an operating system running in the client then processes the push message and sends a push notification to an applicable service worker.

The operating system is running the service worker and the service worker can then process the push notification. After sending the push notification, the client monitors the behavior of the service worker, such as via a component running on the operating system (e.g., a web platform) or via the operating system. For example, the client may monitor whether the service worker performed some action for the push notification, such as displayed the notification to the user or not. Also, once displaying the push notification to the user, the client may monitor the behavior of the service worker when processing the response of a user, such as monitoring how long the service worker took to perform an action based on the user selection of the push notification. The client then compares the behavior to one or more policies, such as a user-visibility policy and a response-time policy, to determine if the behavior violated at least one or more of the policies. For example, the user-visibility policy is a policy regarding whether a service worker displayed a push notification and the response-time policy defines a policy regarding a time the service worker takes to respond to a user response to a push notification. In some embodiments, if the service worker did not display the notification, the client accumulates a violation for a user-visibility policy. Also, if the service worker did not perform an applicable action within a time limit in response to the user selecting the notification, the client accumulates a violation for the response-time policy. The client may then perform a mitigation action when the service worker accumulates a number of violations.

The monitoring of the behavior of the service worker improves the user interface experience. For example, performing a mitigation action may stop a website from the behavior of not displaying notifications to a user and using computing resources in the background without authorization. This may improve the performance of the client by eliminating computing resources that are being used by the service worker while also possibly causing the website to perform the correct action of displaying the notification due to the limiting of the push notifications. Also, by enforcing a time limit to respond to the selection of the notification, the client is stopping a service worker that is not responding in an acceptable time limit and possibly using computing resources without authorization. The monitoring and mitigation actions are an improvement to the scenario described in the Background where the service worker used computing resources without the user's knowledge.

System

FIG. 1 depicts a simplified system 100 for analyzing behavior of service workers according to some embodiments. System 100 includes a client 102, web server 104, and push server 106. One or more applications 116 may run on operating system 112 and are displayed in a user interface (not shown). Applications 116 may include a web application, such as a browser, that may display webpages from a website, which may be hosted on web server 104. In other examples, applications 116 may be native applications running on client 102 that host web based content.

In some embodiments, web server 104 can be any entity that provides content, such as web-based content and/or web-based services. For example, the web server 104 can host a website, be a web application host, be a mobile application host, be a cloud-based service, and in general can host any web application implemented using web technology. Web server 104 may be hosting a website or other application, and web server 104 may be an entity that is separate from client 102. When the term website is used, the website may be a collection of webpages identified by links (uniform resource locators ((URLs)). Each webpage with the same origin (e.g., URL of the website) may be associated with the website. The terms website and webpage may be used interchangeably herein.

In some embodiments, web server 104 is configured to provide web push messages (updates) to a push server 104. Client 102 may subscribe to receiving web push messages by sending a subscription request to push server 106, which then notifies web server 104 to send updates to push server 106. Web server 104 uses the subscription information to provide web push messages to push server 104. A web push message is a message initiated by web server 104 for delivery to application 116, which is executing on the client device 102. Web server 104 identifies the endpoint, such as a uniform resource locator (URL) of push server 104 to send the messages to push server 104. Push server 104 can be any entity that enables the delivery of push messages. The Microsoft® Windows Push Notification Services (WNS) is an example of a web push server. Push server 104 can then send the push messages to the applicable client 102 that has configured the subscription.

Application 116 may include a browser, which may be a web application that refers to an application implemented using web technologies that execute within the context of a web runtime environment. The term "web technologies" refers to languages and multimedia packages that are used in conjunction with each other to produce dynamic web sites. Languages for web sites include hypertext mark-up language (HTML), dynamic HTML (DHTML), JavaScript, cascading style sheets (CSS), and the like. Multimedia packages include the Adobe Flash® multimedia platform and the scalable vector graphics (SVG) platform. Although a browser may be discussed, applications other than the web browser may be used.

Client 102 may be a computing device, such as a laptop computer, personal computer, mobile device, tablet device, etc. In some embodiments, client 102 includes hardware, which includes computer processors, storage, etc. Operating system 112 executes on the hardware and supports the basic functions of the device, such as scheduling tasks, executing applications, and controlling peripheral devices. Operating system 112 is a process that manages the hardware and all the other processes (e.g., applications 116) executing on client 102.

Service worker 110 is initiated by application 116, such as be a website running in a browser. Service worker 110 is running in an application layer 108 on top of operating system 112. A service worker process can execute event-driven code independently of the website, and can be used to perform functions such as handling push messages, background sync operations, geofencing, and the like. In some embodiments, service worker 110 can be a child process that executes in the process space of the browser. In other embodiments, the service worker 110 can run as a thread in the same process as the browser or in a child process of browser. Service worker 110 can execute a service worker script (e.g., a JavaScript™ written by a web developer) to perform the desired functionality. The code executed by service worker 110 is untrusted code because the code is provided by the website running on web server 104. The code may perform undesirable actions on client 102 as client 102 cannot monitor which code is executed.

An underlying communication network (not shown) can provide communication among the web server 104, push server 104, and clients 102. The communication network can comprise any suitable combination of a local area network, wide area network, public switched telephone network, cellular network, and the like.

In the general process of processing push messages, client 102 creates a push subscription to receive push messages from a website. Different processes may be performed to configure the push subscription. Then, at (1), a website at web server 104 may determine that an event has occurred and an update in a push message should be sent. In some embodiments, for example, web server 104 can encrypt the push message using the message public key received from the client 102 during the process of creating the push subscription. Web server 104 can encrypt the encrypted message using its own private key to authenticate web server 104 as the source of the push message. Web server 104 can send the doubly-encrypted message along with a push channel that identifies the target (application 116 or service worker 110) of the push message to push server 106 in a push request.

At (2), push server 106 can process the push request received from web server 104. In some embodiments, push server 106 can authenticate the received push message to verify the source of the push message to be web server 104. For example, push server 106 can use the web server public key provided to push server 106 during the subscription creation phase. If the received push message is not authenticated, push server 106 can deny the push request. Otherwise, push server 106 can communicate the push message to the client 102 in a push channel with the target of the push message identified. Although the above process of sending the push messages is described, other processes may be used.

An OS handler 118 receives the push message and at (3) can forward the push message to web push hander 114. OS handler 118 may be operating system code. Web push handler 114 may be code that is running on operating system 112, such as web platform code. For example web push handler 114 is running in application layer 108. In other embodiments, web push handler 114 is running in operating system 112. Web push handler 114 can process the push message and at (4) send a push notification to service worker 110. The push notification may include details from the push message, such as the type of notification and the payload of the push message. For example, the push notification may indicate an unread e-mail message is available at a website and the number of unread e-mail messages.

Figure 2:
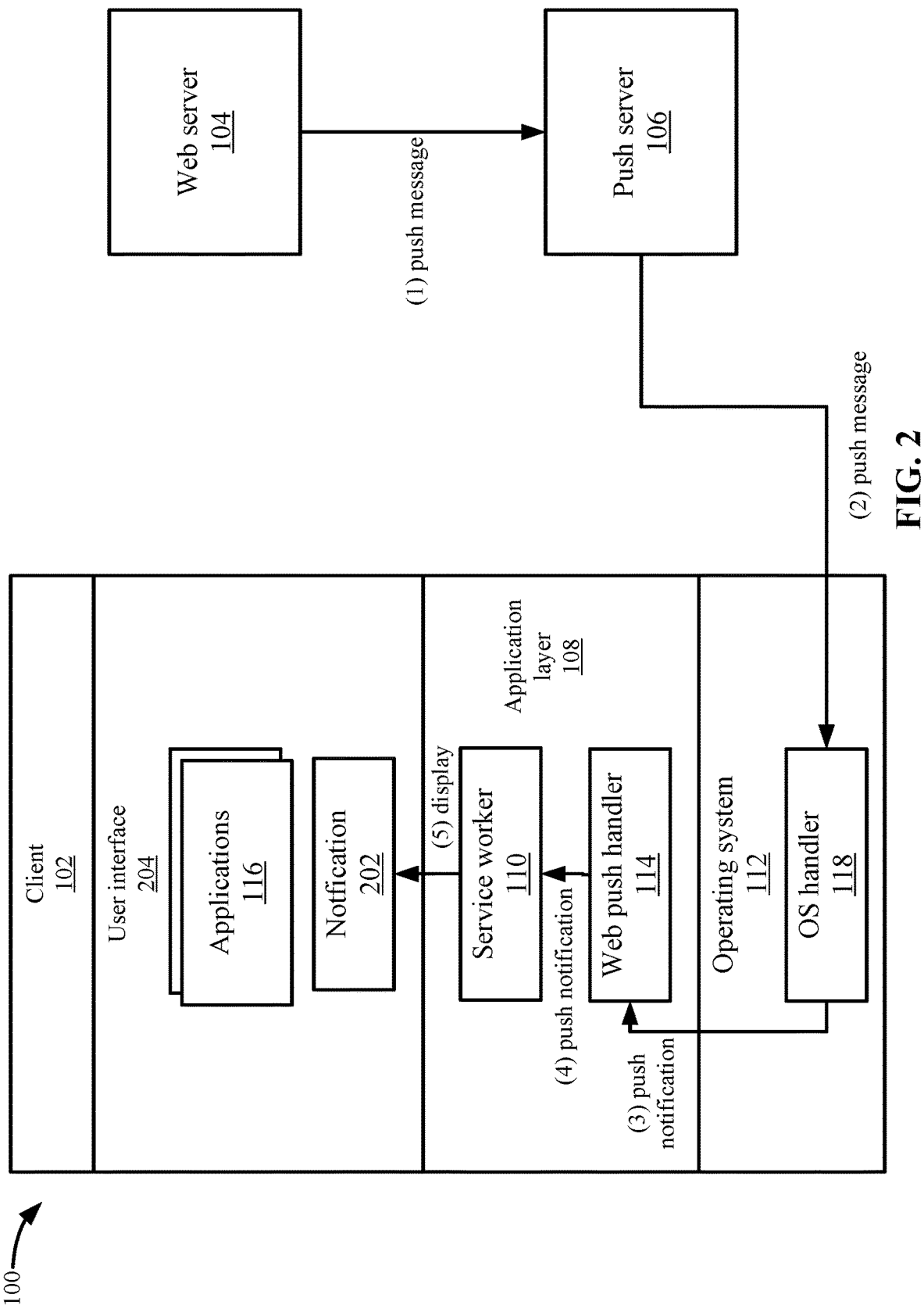
FIG. 2 depicts an example of displaying a push notification according to some embodiments.
Figure 3:
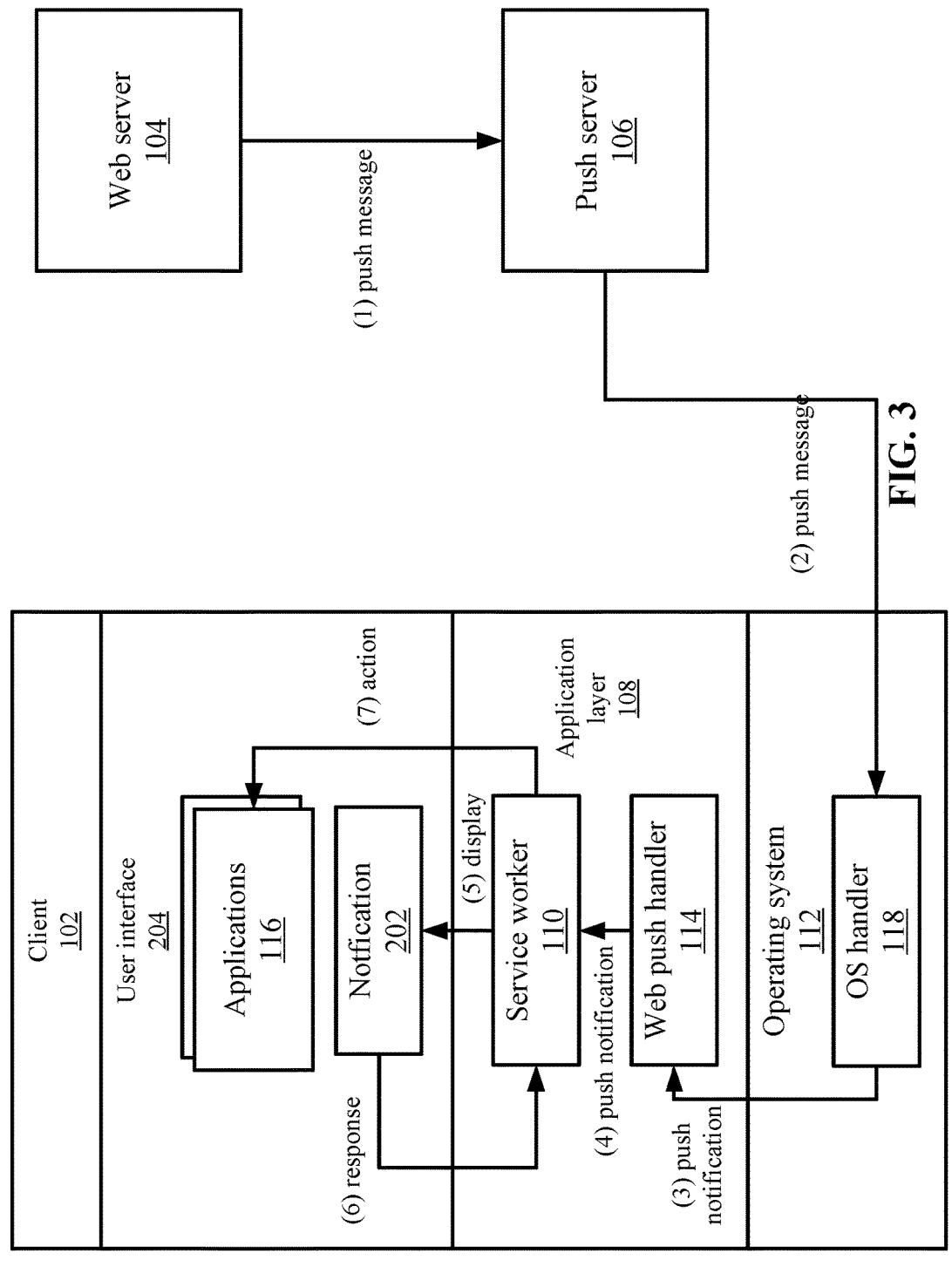
FIG. 3 depicts an example of the process of responding to a selection of the notification according to some embodiments.

Service worker 110 then processes the push notification and may then perform different actions based on the push notification. For example, a first action may be displaying the push notification and then a second action may be responding to a selection of the push notification by the user. For example, service worker 110 may execute software code, such as JavaScript™ code, to display the push notification to the user of client 102. The push notification may be displayed in an application 116 (e.g., browser) or in another portion of the user interface, such as on the desktop or in a separate window on the desktop. The user may select the push notification and then service worker 110 executes code to process the response. For example, service worker 110 may direct the focus to a window or tab for the website or navigate to the website in an existing window or open a new window to navigate to the website. FIGS. 2 and 3 describe the two processes in more detail.

Although push messages are described, some embodiments may be used for other notifications that may not be associated with push notifications. For example, any events that are processed by service workers may be appreciated. For example, the service workers may process other notifications for a website. These notifications may be expected to produce visible results based on processing by the service workers or be processed by the service workers within a time limit.

Notification Display

FIG. 2 depicts an example of displaying a push notification according to some embodiments. A user interface 204 may be displaying applications 116; however, an application that receives a push notification may not need to be open for user interface 204 to display the push notification.

Service worker 110 receives the push notification, and then processes the push notification. In some embodiments, service worker 110 may process the push notification in the background, which may be when an applicable application is not open on client 102. For example, service worker 110 executes software code from the website in the background to cause display of a notification 202 on a user interface 204. At (5), service worker 110 causes display of notification 202. In other embodiments, the web browser may be open and service worker 110 executes the code in the foreground at application layer 108. The foreground may be when the applicable application is open, such as the browser running web push handler 114 is open. However, service worker 110 may execute the website code irrespective if the website is open or not open in the browser.

As discussed above, in some embodiments, service worker 110 may not display notification 202. In other embodiments, service worker 110 may display notification 202, but may display notification 202 after a time limit. Web push handler 114 may monitor the behavior of service worker 110 to determine what action service worker 110 took after receiving the event.

Web push handler 114 can monitor the behavior of service worker 110 because service worker 110 is executing on top of operating system 112. For example, web push handler 114 monitors actions performed by service worker 110 to determine if service worker 110 displayed notification 202. Then, web push handler 114 determines whether service worker 110 violates a policy, such as a user-visibility policy. For example, for displaying the push notification, web push handler 114 may monitor whether service worker 110 executes certain functions. In some examples, web push handler 114 may monitor service worker 110 to determine when a "push" JavaScript™ "Extendable Event" is called to show a notification a user. The push ExtendableEvent is a function that is used to display a push notification. If the function is not executed, then web push handler 114 determines the user-visibility policy is violated. Also, web push handler 114 may determine whether the push notification was displayed after a time limit, which may also violate the policy.

Response to Notification Selection

FIG. 3 depicts an example of the process of responding to a selection of the notification according to some embodiments. Once notification 202 has been displayed, a user can choose to select the notification to have an action performed. For example, the notification may state that unread e-mail messages are available and ask the user if the user would like to read the unread e-mail messages. If the user selects the notification, service worker 110 at (6) receives the response. Then, at (7) service worker 110 performs an action based on the response. The response may be processed in the foreground because the response opens the browser or other application. The browser would then start service worker 110 in the foreground. For example, service worker 110 can direct the focus on user interface 204 to a window or tab for application 116. In some examples, service worker 110 may bring a browser to the forefront of user interface 204 to display the website with the unread e-mail messages. In another example, service worker 110 may navigate to the website on an existing window or open application 116 to display the website with the unread e-mail messages. In another example, service worker 110 may open a new window for the browser to display the website with the unread e-mail messages.

Service worker 110 may have to perform the action within a certain standard time period, such as 30 seconds, or the action cannot be performed at all. This requirement may be configured on client 102 as a general requirement. However, as discussed in the Background, service worker 110 may wait to process the response by waiting until the end of the 30 seconds to perform the action. To address the behavior issue, web push handler 114 may monitor the behavior of service worker 110 to perform the action. If service worker 110 does not perform the action in a time limit that is less than the standard time limit, such as five seconds, web push handler 114 may determine service worker 110 violated a response-time policy. The time limit may be less than the standard time period above where the ability to perform the action is cut off because some embodiments do not want service worker 110 to wait until the end of the time period to perform the action. However, the time limit may be any time up until the end of the standard time period.

Web push handler 114 can monitor the behavior of service worker 110 to determine whether service worker 110 performs the response action within a time limit. For example, web push handler 114 may monitor whether service worker 110 executes a function to respond to the selection of the push notification. In some embodiments, an event is received when notification 202 is selected, such as a "NotificationClick" JavaScript™ "ExtendableEvent". The event should generate an action of calling a function (e.g., subroutine) to perform the response action, such as a call to a "Clients::openWindow( )" or "WindowClient::Focus( )" function. The "NotificationClick "ExtendableEvent" function notifies service worker 110 of the selection of the push notification. The "Clients::openWindow( )" function opens a window and the "WindowClient::Focus( )" function directs the focus of the user interface to a window. Web push handler 114 may monitor service worker 110 to determine when these functions are called. If one of the functions is not executed within a time period, then web push handler 114 determines the response-time policy is violated.

Behavior Analysis

Figure 4:
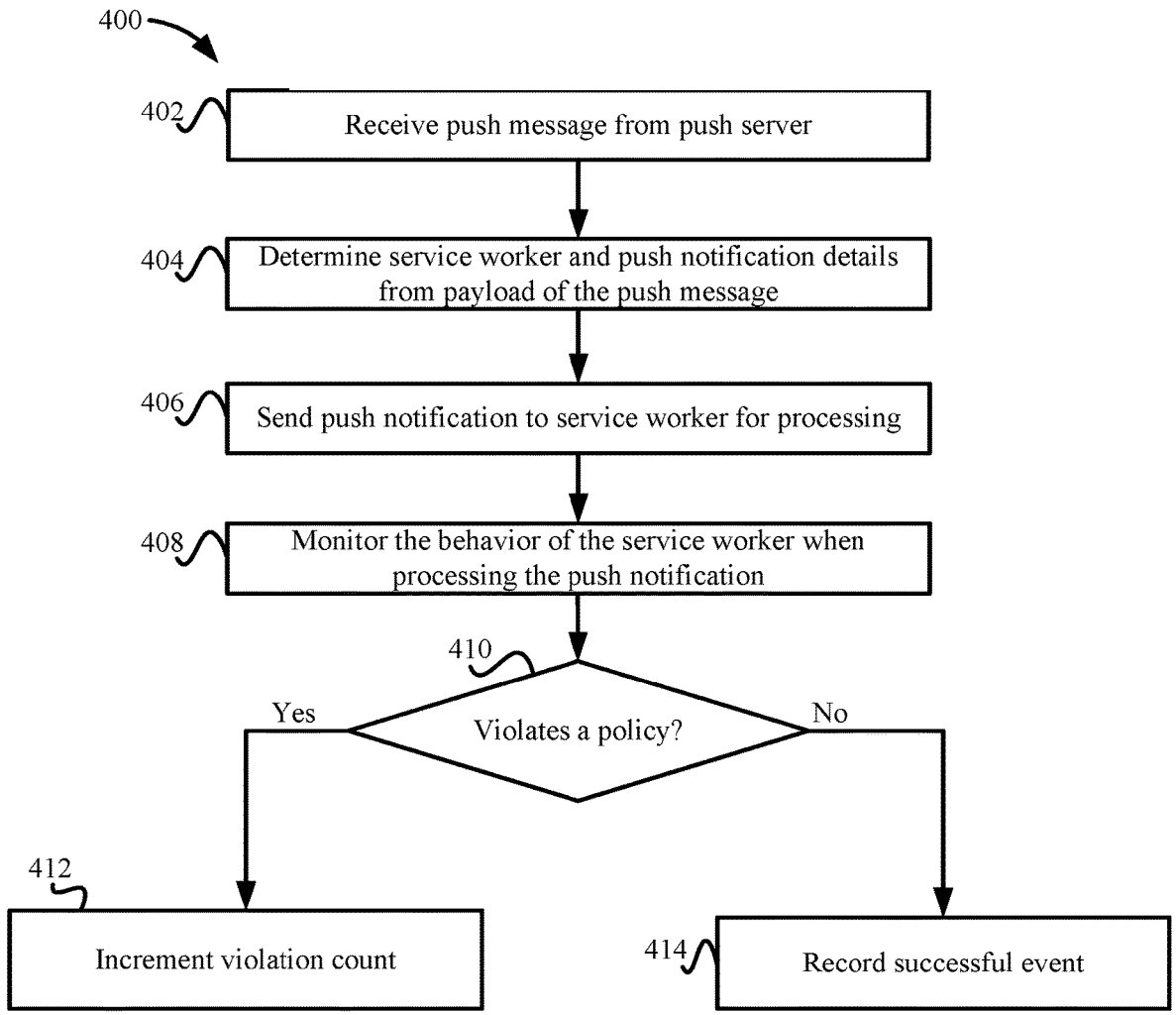
FIG. 4 depicts a simplified flowchart of a method for analyzing the behavior of service workers for the user-visibility policy according to some embodiments.

The process flows for the user-visibility policy and response-time policy will be discussed now. In some embodiments, web push handler 114 may enforce two policies; however, other policies may be appreciated. FIG. 4 depicts a simplified flowchart 400 of a method for analyzing the behavior of service workers 110 for the user-visibility policy according to some embodiments. At 402, web push handler 114 receives a push message from push server 106. At 404, web push handler 114 determines a service worker 110 and details from the payload of the push message. For example, a service worker 110 may be associated with a website in which a push notification was initiated.

At 406, web push handler 114 sends a push notification to service worker 110 for processing. Service worker 110 may then process the push notification as described above. At 408, web push handler 114 monitors the behavior of service worker 110 while service worker 110 is processing the event. For example, web push handler 114 monitors functions executed by service worker 110, if any, to process the push notification. In some examples, web push handler 114 includes a list of functions that should be executed by service worker 110 based on the push notification.

At 410, web push handler 114 determines if the behavior of service worker 110 in processing the push notification violates a policy. As discussed above, web push handler 114 may use a user-visibility policy, but other policies may be appreciated. At 412, if the behavior violates a policy, web push handler 114 increments a violation count. For example, web push handler 114 may increment a violation count for the user-visibility policy. Additionally, web push handler 114 may keep track of a total violation count for the user-visibility and the response-time policies, or any other policies.

If the behavior does not violate a policy, at 414, web push handler 114 records a successful event. In some examples, a successful event may affect the violation count; however, in other cases, a successful event does not affect the violation count. For example, web push handler 114 may reset or decrease the violation count when a successful event occurs. In some examples, if web push handler 114 determines a successful event for user-visibility policy occurs, then web push handler 114 resets that violation count for the user-visibility policy to zero. For example, if the user-visibility violation count is "2", and service worker 110 successfully displays a notification, then web push handler 114 resets the violation count for the user-visibility policy to zero. In other embodiments, web push handler 114 may decrease the violation count, such as from two to one. However, web push handler 114 may not reset the total violations when a successful event occurs. The total violations may be testing the number of violations per a time period, such as a week, and may not be reset. However, in other examples, web push handler 114 may reset the total violations or decrease the total violations when a successful event occurs.

Figure 5:
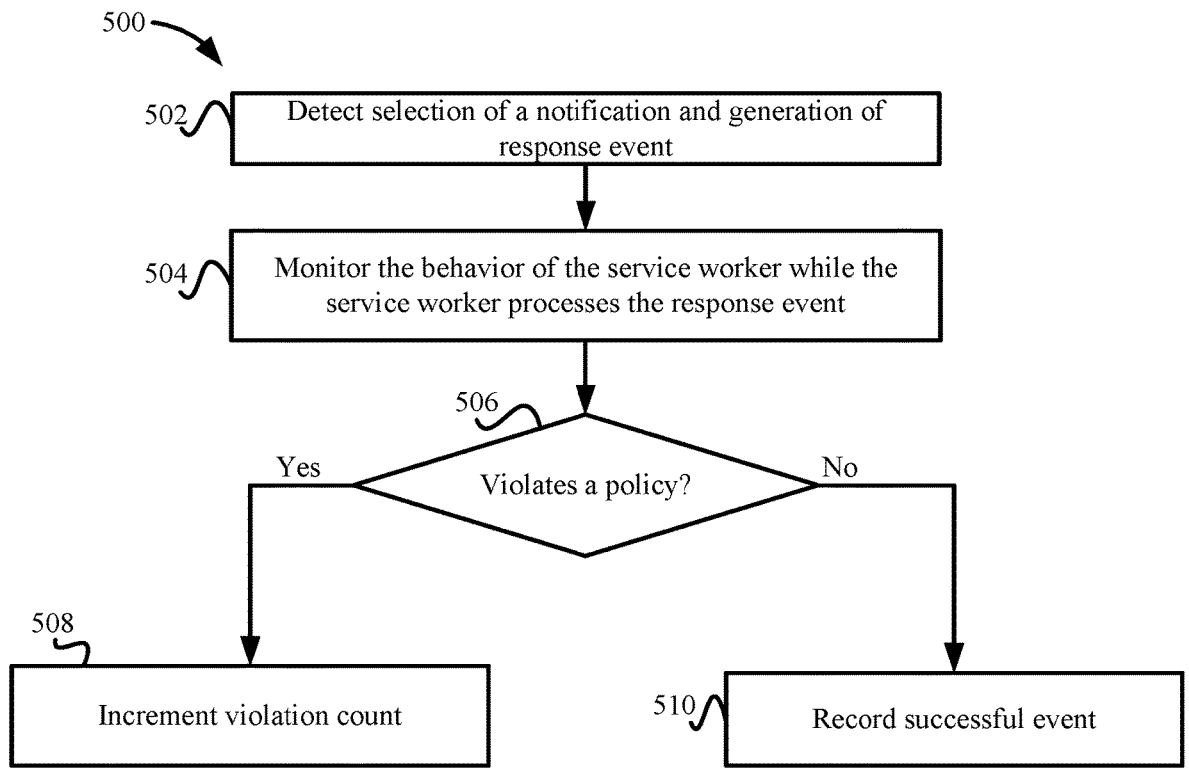
FIG. 5 depicts a simplified flowchart of a method for analyzing the behavior of service workers for the response-time policy according to some embodiments.

FIG. 5 depicts a simplified flowchart 500 of a method for analyzing the behavior of service workers 110 for the response-time policy according to some embodiments. At 502, web push handler 114 detects a selection of a notification and a generation of a response event for service worker 110 to process. Service worker 110 should perform some action based on the generation of a response event. At 504, web push handler 114 monitors the behavior of service worker 110 while service worker 110 processes the response event. As discussed above, web push handler 114 may monitor the execution of functions, if any, that are associated with the response event to determine if service worker 110 executes those functions.

At 506, web push handler 114 determines if service worker 110 violates a policy, such as the response-time policy. At 508, if the response-time policy is violated, web push handler 114 increments the violation count for the response-time policy. However, if the response-time policy is not violated, at 510, web push handler 114 records a successful event. Similar to the user-visibility policy, web push handler 114 may reset or decrease the violation count for the response-time policy after a successful event. However, the total violations for the response-time policy may not be reset. In other examples, the total violations for the response-time policy may be reset or decremented upon a successful event.

Mitigation Actions

Figure 6:
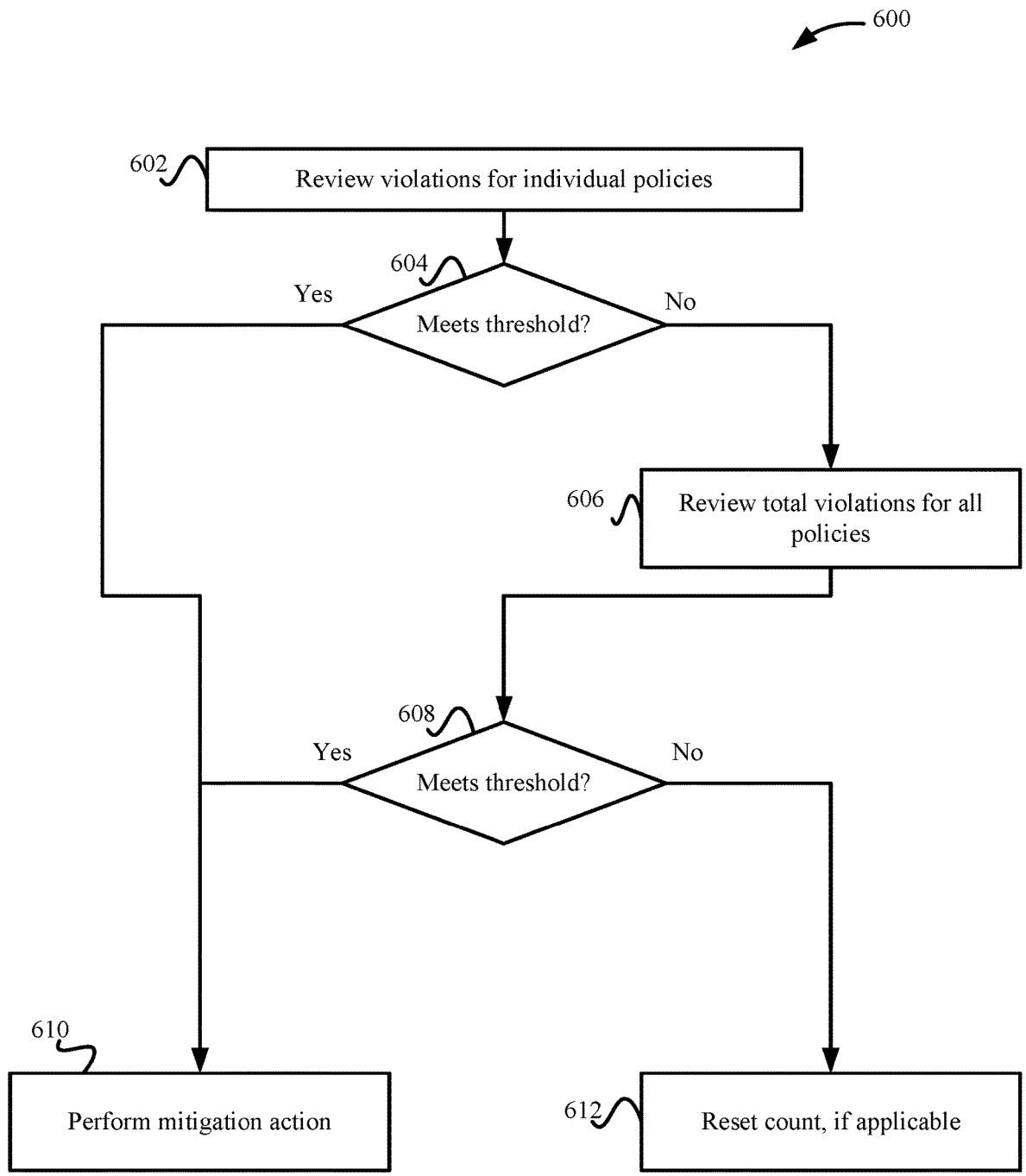
FIG. 6 depicts a simplified flowchart of a method for performing a mitigation action according to some embodiments.

Web push handler 114 may perform different mitigation actions based on the violations. FIG. 6 depicts a simplified flowchart 600 of a method for performing a mitigation action according to some embodiments. At 602, web push handler 114 reviews violations for the individual policies. For example, each individual policy, such as the user-visibility policy and the response-time policy, may have a respective violation count. Web push handler 114 may enforce a threshold for each respective policy. For example, the threshold may be three violations for any of the respective policies.

At 604, web push handler 114 determines if the violation count for any policy meets a threshold. For example, with a threshold of three, if the response-time policy is incremented from three violations to four violations, then web push handler 114 determines that the response-time policy has met the threshold. However, the threshold may be met in other ways, such as in other embodiments, the threshold may be met by being equal to or greater than the threshold. If the violation count for one of the individual policies does not meet the threshold, at 606, web push handler 114 reviews the total violations for all policies. For example, the total violations may not exceed a threshold for a time period, such as 20 violations per 7 days. Other time periods may also be appreciated and the total violations may be for all policies or a subset of policies.

At 608, web push handler 114 determines if the total violations meets the threshold. For example, for a threshold of 20, if the total violations are incremented from 20 violations to 21 violations, then the total violations may meet the threshold. In other examples, the total violations may meet the threshold in different ways, such as by being equal to or greater than the threshold.

If either the individual policy violations or the total violations meet the threshold, at 610, web push handler 114 performs a mitigation action. Web push handler 114 may perform different mitigation actions. For example, the mitigation action may cause the revocation of the push subscription and permission to use the push notification. The revocation of the push subscription may cause push messages to stop being sent. To stop the push messages, web push handler 114 may cause an unsubscribe message to be sent to push server 106, which unsubscribes the push channel with client 102. In this case, push server 106 may not send push messages for the push channel to client 102. In some examples, web server 104 may still send a push message from a website when an event occurs on the website. However, push server 106 may respond with a message that this push channel is now invalid and to stop sending push messages for the website. Other methods of unsubscribing from the push channel may also be appreciated, such as web push handler 114 may send an unsubscribe message to web server 104.

Another mitigation action may be to not allow service worker 110 to output a notification or respond to a notification. For example, web push handler 114 may still receive push messages, but not forward the push notifications for the push messages to service worker 110. Further, other mitigation actions may be to remove a service worker so the service worker can no longer process notifications or uninstall a service worker that has been previously installed when the webpage was loaded.

The mitigation may be in force until different requirements are met. For example, until service worker 110 is updated, web push handler 114 may restrict the push notifications. For example, a developer may edit the code for service worker 110 to change the behavior of service worker 110 upon receiving the event. Upon detecting the change in code, web push handler 114 may allow push messages to be processed and sent to service worker 110 again. In this case, web push handler 114 may send another push subscription message to subscribe to push messages. In other examples, web push handler 114 may not have unsubscribed service worker 110 and thus does not need to re-subscribe. Rather, web push handler 114 can now allow push notifications for push messages that are received to be sent to service worker 110.

If the individual policies or total violations do not meet the threshold, at 612, web push handler 114 may reset the count, if applicable. For example, a successful event resets the violations for the respective individual policy, but not the total number of violations.

CONCLUSION

Accordingly, web push handler 114 can enforce policies for the operation of service worker 110. Because service worker 110 is operating in the background, a user may not be able to effectively discern what is being performed by a service worker 110. By enforcing policies, web push handler 114 is improving the operation of client 102 by performing mitigation actions when the performance of service worker 110 does not meet certain thresholds. Additionally, using the mitigation actions, web push handler 114 may cause service workers 110 to provide a better user interface experience, such as by displaying notifications when applicable or by responding to events that are received, such as a notification or a response to a notification, in a more timely manner because developers are notified of the suspension of the push subscription. This may save the amount of computing resources used by service workers 110.

Example Computer System

Figure 7:
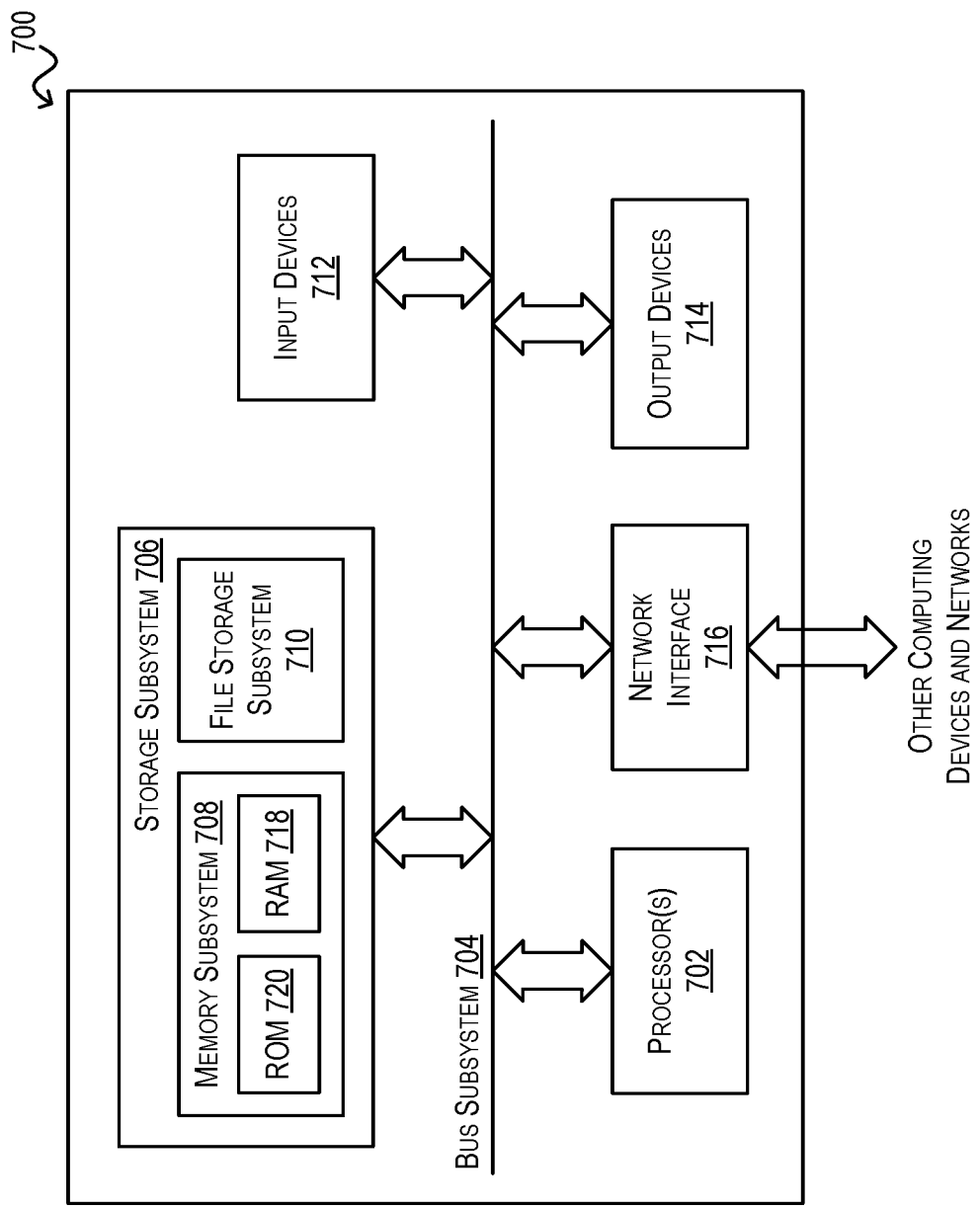
FIG. 7 depicts a simplified block diagram of an example computer system according to certain embodiments.

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple buses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage device having stored thereon program code that, when executed by the processor, causes the processor to:
   detect a notification for a service worker, the service worker being configured to process the notification for a website;
   monitor a behavior of the service worker to process the notification, wherein the service worker is configured to execute software code to process the notification, and wherein the behavior of the service worker that is monitored includes producing a visible result for the notification and responding to a selection of the notification within a time period;
   compare the behavior of the service worker to display the notification to first policy to determine that the behavior violated a restriction on producing the visible result for the notification;
   compare the behavior of the service worker to a second policy to determine whether the behavior violated a restriction on responding to the selection of the notification within the time period after the visible result for notification is produced; and
   perform a mitigation action based on the service worker violating the first policy or the second policy, the mitigation action restricting an aspect of use of the notification for the website.

2. The computer system of claim 1, further configured to:
   receive the notification at an operating system; and
   send the notification to the service worker, the service worker running at an application level to process the notification.

3. The computer system of claim 1, wherein monitoring the behavior of the service worker comprises monitoring whether the service worker executes a function associated with the notification.

4. The computer system of claim 3, wherein the function displays the notification to a user.

5. The computer system of claim 3, wherein the function comprises a service worker action to perform within the time period.

6. The computer system of claim 5, wherein the service worker action directs focus to a webpage associated with the notification or opens a window for the webpage associated with the notification.

7. The computer system of claim 1, wherein comparing the behavior of the service worker to display the notification to the first policy comprises:
   compare the behavior of the service worker to test whether the notification is displayed.

8. The computer system of claim 1, wherein comparing the behavior of the service worker to the second policy comprises:
   compare the behavior of the service worker to test whether the selection of the notification is processed within the time period to display the application.

9. The computer system of claim 8, wherein the second policy tests whether a function that opens a window or directs focus to a window is executed.

10. The computer system of claim 9, wherein the second policy tests whether the function that opens the window or directs focus to the window is executed within the time period.

11. The computer system of claim 1, further configured to:
    accumulate a policy specific violation count if the first policy or the second policy is violated based on the comparing of the behavior of the service worker to the first policy or the second policy, the policy specific violation count accumulating violations for the first policy or the second policy, wherein the mitigation action is performed when the policy specific violation count meets a threshold.

12. The computer system of claim 1, further configured to:
    accumulate a total violation count if the first policy or the second policy is violated based on the comparing of the behavior of the service worker to the first policy or the second policy, the total violation count accumulating a total amount of violations for the first policy and the second policy, wherein the mitigation action is performed when the total violation count meets a threshold.

13. The computer system of claim 1, further configured to:
    accumulate a policy specific violation count if the first policy or the second policy is violated based on the comparing of the behavior of the service worker to the one or more policies;
    accumulate a total violation count if the first policy or the second policy is violated based on the comparing of the behavior of the service worker to the first policy or the second policy; and
    determine when one of the policy specific violations meets a first threshold or the total violations meets a second threshold, wherein the mitigation action is performed when the policy specific violation count meets the first threshold or the total violation count meets the second threshold.

14. The computer system of claim 1, wherein performing the mitigation action comprises:
    send an unsubscribe message to unsubscribe the service worker from receiving notifications.

15. The computer system of claim 1, wherein performing the mitigation action comprises:
    not sending a future notification to the service worker when the future notification is received for the service worker.

16. The computer system of claim 1, further configured to:
    adjust an amount of violations when the behavior of the service worker does not violate the one or more policies.

17. The computer system of claim 1, wherein the service worker is running in a background of the computer system to process the notification.

18. The computer system of claim 1, wherein the notification is a push notification from the website, the push notification being initiated by the website based on a change at the website.

19. A method comprising:
    detecting, by a computer system, a notification for a service worker, the service worker being configured to process the notification for a website;
    monitoring, by the computing system, a behavior of the service worker to process the notification, wherein the service worker is configured to execute software code to process the notification, and wherein the behavior of the service worker that is monitored includes producing a visible result for the notification and responding to a selection of the notification within a time period;

comparing, by the computing system, the behavior of the service worker to display the notification to a first policy to determine that the behavior violated a restriction on producing the visible result for the notification;

compare the behavior of the service worker to a second policy to determine whether the behavior violated a restriction on responding to the selection of the notification within the time period after the visible result for notification is produced; and performing, by the computer system, a mitigation action based on the service worker violating the first policy or the second policy, the mitigation action restricting an aspect of use of the notification for the website.

20. A computer readable storage device having stored thereon program code executable by a computer system, the program code causing the computer system to:

detect a notification for a service worker, the service worker being configured to process the notification for a website;

monitor a behavior of the service worker to process the notification, wherein the service worker is configured to execute software code to process the notification, and wherein the behavior of the service worker that is monitored includes producing a visible result for the notification and responding to a selection of the notification within a time period;

compare the behavior of the service worker to display the notification to a first policy to determine that the behavior violated a restriction on producing the visible result for the notification;

compare the behavior of the service worker to a second policy to determine whether the behavior violated a restriction on responding to the selection of the notification within the time period after the visible result for notification is produced; and perform a mitigation action based on the service worker violating the first policy or the second policy, the mitigation action restricting an aspect of use of the notification for the web site.

* * * * *